United States Patent
Andersson (10) Patent No.: US 11,500,690 B2
(45) Date of Patent: Nov. 15, 2022

(54) DYNAMIC LOAD BALANCING IN NETWORK CENTRIC PROCESS CONTROL SYSTEMS

(71) Applicant: ABB Schweiz AG, Baden (CH)

(72) Inventor: Staffan Andersson, Lund (SE)

(73) Assignee: ABB Schweiz AG, Baden (CH)

( * ) Notice: Subject to any disclaimer, the term of this patent is extended or adjusted under 35 U.S.C. 154(b) by 281 days.

(21) Appl. No.: 16/795,251

(22) Filed: Feb. 19, 2020

(65) Prior Publication Data

US 2020/0278891 A1 Sep. 3, 2020

(30) Foreign Application Priority Data

Mar. 1, 2019 (EP) ..................................... 19160295

(51) Int. Cl.
*G06F 9/46* (2006.01)
*G06F 9/50* (2006.01)
(Continued)

(52) U.S. Cl.
CPC .......... *G06F 9/5083* (2013.01); *G06F 9/4881* (2013.01); *G06F 13/4068* (2013.01)

(58) Field of Classification Search
CPC ... G06F 9/5083; G06F 9/4881; G06F 13/4068
See application file for complete search history.

(56) References Cited

U.S. PATENT DOCUMENTS

| 7,137,126 B1* | 11/2006 | Coffman | ............... | H04M 3/493 |
| | | | | 704/E15.04 |
| 7,228,185 B2* | 6/2007 | Patz | ..................... | G05B 19/042 |
| | | | | 700/20 |

(Continued)

FOREIGN PATENT DOCUMENTS

CN 103593347 A 2/2014

OTHER PUBLICATIONS

Baert, Quentin ; Caron, Anne-Cécile ; Morge, Maxime ; Routier, Jean-Christophe; Negotiation Strategy of Divisible Tasks for Large Dataset Processing;, Oct. 14, 2018.*

(Continued)

*Primary Examiner* — Camquy Truong
(74) *Attorney, Agent, or Firm* — Whitmyer IP Group LLC (57) ABSTRACT

A method for dynamic load balancing between nodes in a network centric process control system. The network centric process control system includes a plurality of nodes and each node includes control service components, where each control service component is a separate executable running in a separate operating system process as provided by a real time operating system of each node. The method is performed by a node manager of a node, and the method includes negotiating a load balancing master role between the plurality of nodes, wherein the negotiating is based on an indication of the plurality of nodes representing load balancing cluster nodes, subscribing, in the negotiated load balancing master role, to a load balancing information from nodes of the load balancing cluster nodes, and reallocating, in the negotiated load balancing master role, one or more control logic tasks from one node to another node of the plurality of nodes based on the subscribed load balancing information. A node manager, a computer program, and a computer program product thereof are also presented.

16 Claims, 7 Drawing Sheets

(51) Int. Cl.
  *G06F 9/48* (2006.01)
  *G06F 13/40* (2006.01)

(56) References Cited

U.S. PATENT DOCUMENTS

| | | | |
|---|---|---|---|
| 7,461,130 B1 * | 12/2008 | AbdelAziz | H04L 67/1093 709/208 |
| 2003/0140108 A1 | 7/2003 | Sampathkumar | |
| 2006/0136929 A1 | 6/2006 | Miller et al. | |
| 2017/0070599 A1 | 3/2017 | Bute et al. | |
| 2018/0041940 A1 * | 2/2018 | Tsai | H04W 52/283 |

OTHER PUBLICATIONS

European Extended Search Report Application No. 19160295 Completed: Jul. 11, 2019; dated Jul. 17, 2019 10 pages.

* cited by examiner

DYNAMIC LOAD BALANCING IN NETWORK CENTRIC PROCESS CONTROL SYSTEMS

TECHNICAL FIELD

The present disclosure relates to a method, node manager, computer program and computer program product for dynamic load balancing between nodes in a network centric process control system.

BACKGROUND

Today's process controllers execute a set of control logic applications using IO (in/out) interfaces and devices connected to the controller, or via fieldbuses connected to the controller. In case of overload in a controller, one or several control applications must be reallocated to another controller. As the reallocated control applications accesses IO in the previous controller, a controller-to-controller communication must be configured and downloaded to the controllers. This has a cost in terms of an extra engineering effort and adds a risk for introduction of errors.

SUMMARY

One objective is to reduce a risk for introduction of errors in a network centric process control system.

According to a first aspect there is presented a method for dynamic load balancing between nodes in a network centric process control system. The network centric process control system comprises a plurality of nodes and each node comprises control service components, where each control service component is a separate executable running in a separate operating system process as provided by a real time operating system of each node. The method is performed by a node manager of a node, and the method comprises negotiating a load balancing master role between the plurality of nodes, wherein the negotiating is based on an indication of the plurality of nodes representing load balancing cluster nodes, subscribing, in the negotiated load balancing master role, to a load balancing information from nodes of the load balancing cluster nodes, and reallocating, in the negotiated load balancing master role, one or more control logic tasks from one node to another node of the plurality of nodes based on the subscribed load balancing information.

The reallocation processing block may comprise sending, in the negotiated load balancing master role, initiation commands to two of the plurality of nodes, to prepare to reallocate control logic tasks there between, and sending, in the negotiated load balancing master role, commit commands to the two of the plurality of nodes, to stop the prepared control logic execution in one of the two nodes and to start the prepared control logic execution in the other of the two nodes. The initiation commands may comprise an instruction to load control logic configuration for the control logic tasks to be taken over, and the commit commands may comprise an instruction to synchronize states for the control logic tasks to be taken over.

Each node may further comprise a middleware service managing subscribing to signals and publishing of signals.

The one or more control logic tasks may constitute a control service of the node.

The negotiating may be based on load balancing configuration comprising the indication of the load balancing cluster nodes.

The method may further comprise receiving, prior to negotiating, a load balancing configuration from an engineering tool of the network centric process control system, wherein the load balancing configuration comprises the indication of the plurality of nodes representing the load balancing cluster nodes.

The processing block negotiating may further comprise negotiating a redundant load balancing master role between the plurality of nodes.

According to a second aspect there is presented a node manager for dynamic load balancing in a network centric process control system. The network centric process control system comprises a plurality of nodes and each node comprises control service components, where each control service component is a separate executable running in a separate operating system process as provided by a real time operating system of each node. The node manager comprises a processor, and a computer program product storing instructions that, when executed by the processor, causes the node manager to negotiate a load balancing master role between the plurality of nodes, wherein the negotiating is based on an indication of the plurality of nodes representing load balancing cluster nodes, subscribe, in the negotiated load balancing master role, to a load balancing information from nodes of the load balancing cluster nodes, and to reallocate, in the negotiated load balancing master role, one or more control logic tasks from one node to another node of the plurality of nodes based on the subscribed load balancing information.

The node manager may in reallocation be caused to send, in the negotiated load balancing master role, initiation commands to two of the plurality of nodes, to prepare to reallocate control logic tasks there between, and to send, in the negotiated load balancing master role, commit commands to the two of the plurality of nodes, to stop the prepared control logic execution in one of the two nodes and to start the prepared control logic execution in the other of the two nodes. The initiation commands may comprise an instruction to load control logic configuration for the control logic tasks to be taken over, and the commit commands may comprise an instruction to synchronize states for the control logic tasks to be taken over.

The negotiating may be based on load balancing configuration comprising the indication of the load balancing cluster nodes.

The subscribe processing block may comprise subscribe to a load balancing information from all nodes of the load balancing cluster nodes.

According to a third aspect there is presented a computer program for dynamic load balancing in a network centric process control system. The network centric process control system comprises a plurality of nodes and each node comprises control service components, where each control service component is a separate executable running in a separate operating system process as provided by a real time operating system of each node. The computer program comprising computer program code, which when run in a network centric process control system, causes the network centric process control system to negotiate a load balancing master role between the plurality of nodes, wherein the negotiating is based load balancing configuration comprising the indication of the load balancing cluster nodes, subscribe, in the negotiated load balancing master role, to load balancing information from all nodes of the load balancing cluster nodes, and to reallocate, in the negotiated load balancing master role, one or more control logic tasks from one node to another node of the plurality of nodes based on the subscribed load balancing information.

A computer program product comprising a computer program and a computer readable storage means on which the computer program is stored is also presented.

Embodiments presented herein enables handling of overload situations in running controllers by dynamic load balancing of control logic execution load, without any changes in control logic, without adding controller-to-controller communication, and without download to controllers or gateways.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The processing blocks of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
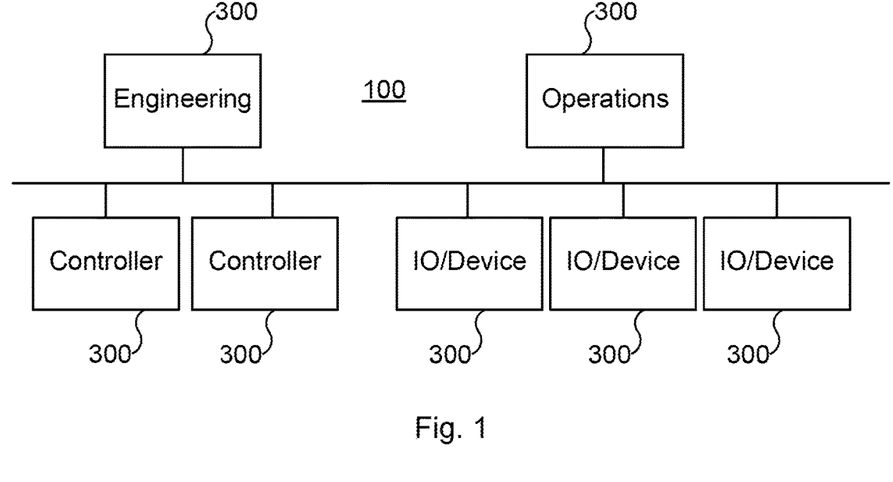
FIG. 1 schematically illustrates a network centric process control system architecture.

In a network centric process control system 100 architecture, illustrated in a logical topology in FIG. 1, IOs and devices 300 are not owned by a controller 300, as in a controller centric architecture. The engineering 300 tool for IO and device configuration deploys configuration data to the IO and devices 300 without involving a controller 300. Controllers 300 are focused on execution of control logic and can access IO signals from any IO or device 300. The network centric process control system 100 architecture provides a system-wide easy access to IO and device information from upper system levels, such as operations 300 and engineering 300, without any routing of information through the controller 300. The control logic doesn't have to be updated to access IO and device information.

Figure 2:
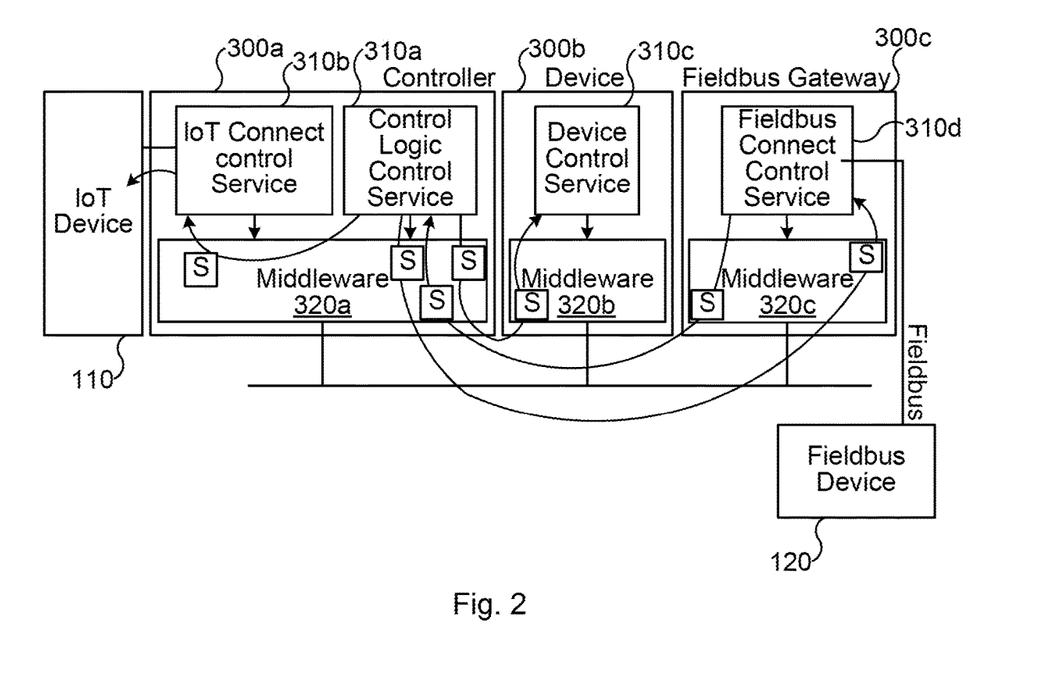
FIG. 2 schematically illustrates control services allocated to different nodes.

The network centric process control system 100 architecture has, as illustrated in FIG. 2, middleware services 320a, 320b, and 320c handling exchange of process data, represented as signals S, between control services 310a, 310b, 310c and 310d, where the control services represent the principal services in controllers, gateways and devices, such as execution of control logic in a controller, scanning of IO and field devices in a fieldbus gateway, managing the device functionality in a device etc.

Control services are typically allocated in different nodes, with one or multiple control services per node.

A control service 310a has no knowledge about where other control services 310b, 310c and 310d that the control service 310a interacts with are allocated. This is handled by the middleware service 320a and is transparent to the control service 310a. FIG. 2 shows an example with four control services 310a, 310b, 310c, and 310d executing in three different nodes—a device node 300b, a fieldbus gateway node 300c and a controller node 300a, where the controller node 300a hosts two control services 310a and 310b. All three nodes have a middleware service 320a, 320b, and 320c, respectively, that handles the signal S exchange between the control services in the different nodes as well as between control services allocated in the same node (i.e. in the controller 300a in this example).

Interactions with controllers, devices etc. not using the middleware services can be handled by control services specific for the communication protocol needed for the interaction, as illustrated in FIG. 2. An IoT Connect control service 310b connects to IoT devices 110 and a Fieldbus Connect control service 310d connects to fieldbus devices 120, e.g. Profibus devices. Such control services 310b and 310d can execute in any node 300a, 300b, or 300c, e.g. in the controller node 300a, as the IoT Connect control service 310b, or in a separate node 300c, as the fieldbus connect control service 310d.

Middleware and control services are built as separate executables, running in separate operating system processes, for memory protection and isolation of faults. A control service interacts with middleware services through inter process communication.

Control services are configured by a set of engineering tools, one tool for each control service type, e.g. one engineering tool for control logic configuration and another tool for IO and device configuration. This gives an isolation of e.g. control logic engineering from IO engineering, i.e. control logic can be completely engineered without knowing where the control logic will be executed, or how/where the IO and devices are connected.

Middleware service is configured by a middleware configuration component, which uses signal definitions provided by the tools to create the middleware configuration. The middleware configuration is sent with the control service configuration and forwarded to middleware service by the control services.

A signal defines an interface between a publisher and a subscriber for process data to be exchanged. A signal may contain the following attributes:

system unique signal ID, data type for the signal value, such as Boolean for digital signals or float for analogue signals, ranges (or intervals) and engineering units for the signal value (only used for analogue signals), override value, used by the signal subscriber in case of bad signal quality, e.g. if the subscriber did not get any signals from the publisher, e.g. due to network error, and substitute value, used by the signal publisher in case of bad signal quality, e.g. if an IO scanner has detected an error on an input channel on a fieldbus device.

Signals are configured and connected to control logic variables and IO channels, in the engineering tools for control logic and IO engineering, and downloaded to the nodes. It is the responsibility of the middleware configuration component to guarantee that the signal IDs are unique within the system.

Dynamic load balancing is handled in a network centric process control system based on control services and middleware services. The dynamic load balancing function balances the control logic execution load between controllers in the network centric process control system.

The dynamic load balancing function can be used either in the engineering of the network centric process control system, in the normal operation of a network centric process control system, or in both.

Figure 3A:
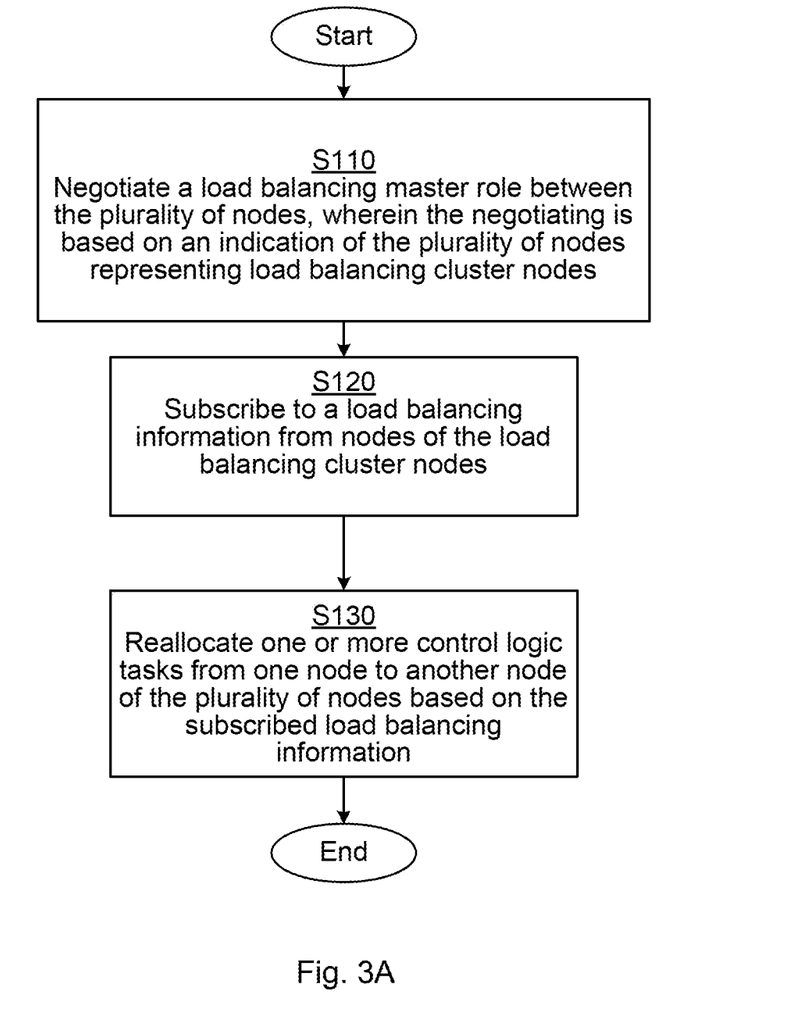
FIGS. 3A and 3B are flow charts illustrating methods for embodiments presented herein.

An embodiment of a method for dynamic load balancing between nodes in a network centric process control system is presented with reference to FIG. 3A. The network centric process control system 100 comprises a plurality of nodes 300a and each node comprises control service components 310a, where each control service component is a separate executable running in a separate operating system process as provided by a real time operating system of each node. In some aspects the method is performed by a node manager 330a of a node. In process block S110 a load balancing master role is negotiated between the plurality of nodes, as further described below and in greater detail in conjunction with below figures. The negotiating is based on an indication of the plurality of nodes representing load balancing cluster nodes. In process block S120 the negotiated load balancing master role subscribes to a load balancing information from nodes of the load balancing cluster nodes, as further described below and in greater detail in conjunction with below figures. In processing block S130 the negotiated load balancing master role reallocates one or more control logic tasks from one node to another node of the plurality of nodes based on the subscribed load balancing information, as further described below and in greater detail in conjunction with below figures.

Node managers in non-master nodes regularly publishes current load data, which the master (and optionally also the redundant master) subscribes to. During a reallocation of control logic from a node, the node receives an initiation command, after which the node prepares for reallocation, and when initiated the node receives a commit command to stop its control logic execution (or partial tasks thereof).

Figure 3B:
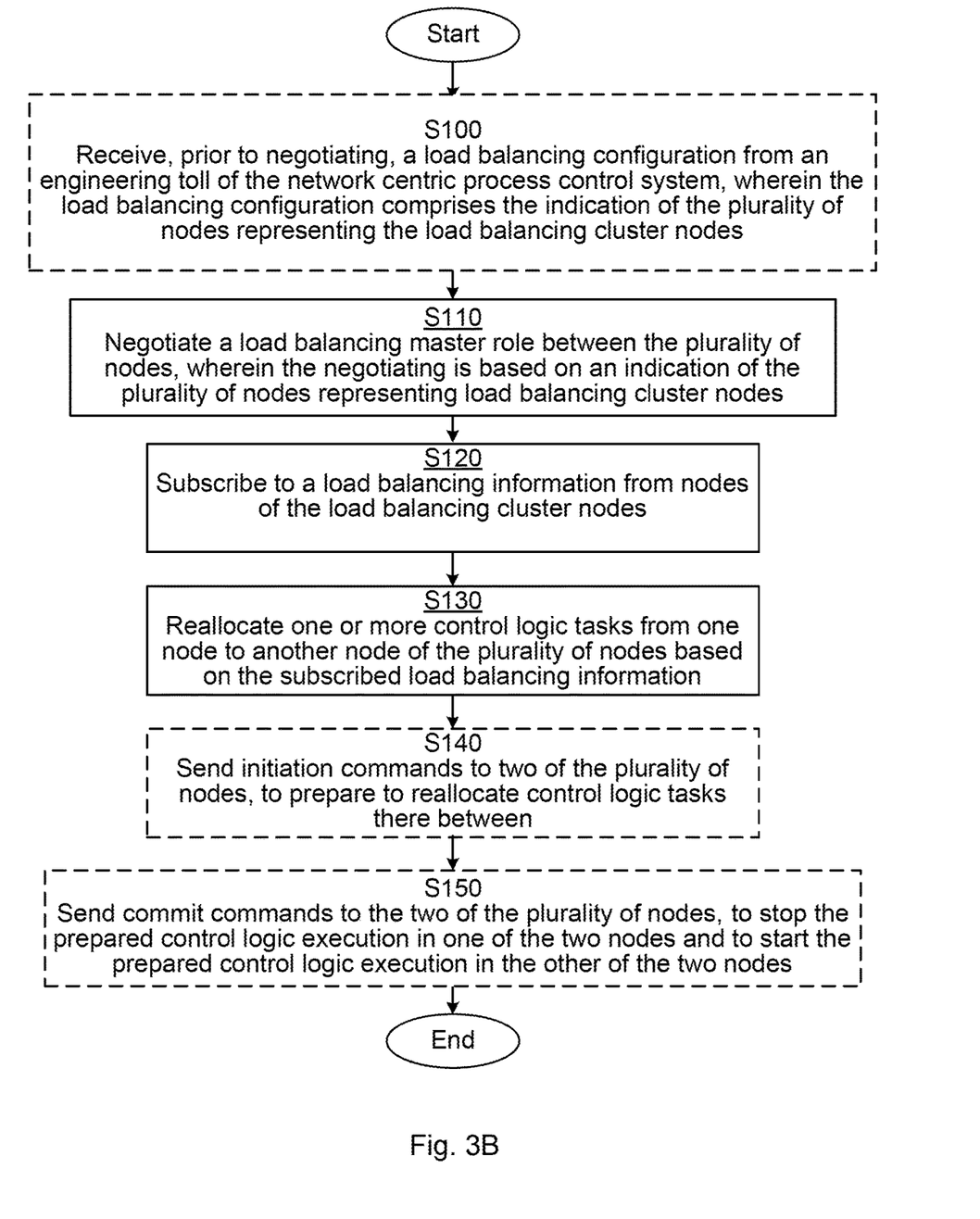

FIG. 3B is a flowchart illustrating further embodiments of methods for dynamic load balancing between nodes in a network centric process control system shown in FIG. 3A. In processing block S140 the negotiated load balancing master role sends initiation commands to two of the plurality of nodes, to prepare to reallocate control logic tasks there between. In processing block S150 the negotiated load balancing master role sends commit commands to the two of the plurality of nodes, to stop the prepared control logic execution in one of the two nodes and to start the prepared control logic execution in the other of the two nodes.

Load balancing or reallocation is a continuous process, i.e. repeatable without a new negotiation. After processing block S150, a new overload situation may thus result in that processing blocks S130-S150 are repeated.

The initiation commands may comprise an instruction to load control logic configuration for the control logic tasks to be taken over. The initiation commands may prepare for execution by e.g. subscribing to signals in a middleware service 320a. The commit commands may comprise an instruction to synchronize states for the control logic tasks to be taken over.

Each node 300a may further comprise a middleware service 320a managing subscribing to signals and publishing of signals.

The one or more control logic tasks may constitute a control service 310a of the node 300a.

The negotiating may be based on load balancing configuration comprising the indication of the load balancing cluster nodes.

In processing block S100, prior to negotiating, a load balancing configuration is received from an engineering tool of the network centric process control system 100. The load balancing configuration comprises the indication of the plurality of nodes representing the load balancing cluster nodes.

The subscribing processing block may comprise subscribing to a load balancing information from all nodes of the load balancing cluster nodes.

The node may be one or more of a device node, a fieldbus gateway node and a controller node.

The processing block S110 may further comprise negotiating a redundant load balancing master role between the plurality of nodes.

The operations shown in FIGS. 3A and 3B will now be illustrated and described in more detailed in conjunction with FIGS. 4-8 below.

Figure 4:
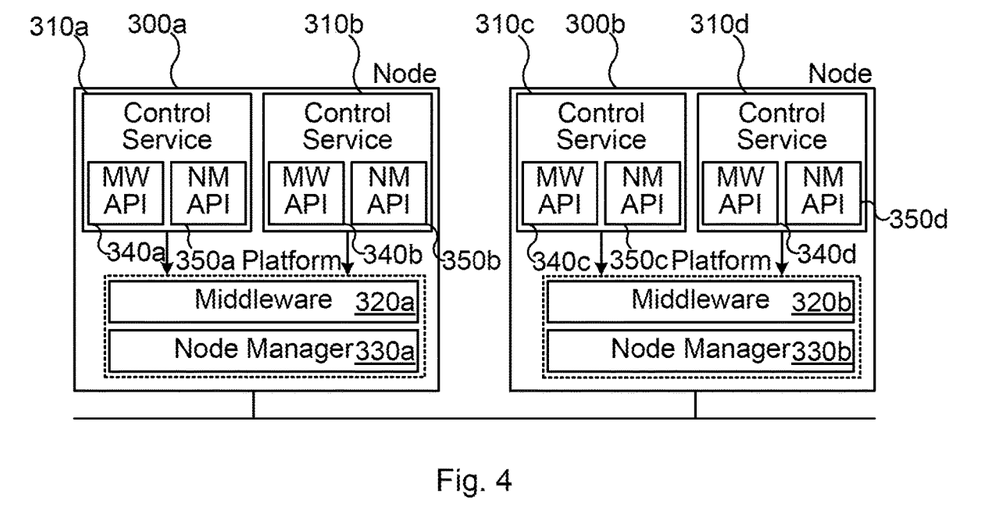
FIG. 4 schematically illustrates a node architecture for controllers, gateways and devices.

The component architecture for controllers, gateways and devices in the network centric process control system, in the following called nodes, is illustrated in FIG. 4.

Each node 300a and 300b has one or more control service components 310a, 310b, 310c, and 310d running on a platform comprising a middleware component 320a and 320b, and a node manager component 330a and 330b. Each component is a separate executable running in a separate operating system process provided by a real time operating system (not shown in the figure).

To simplify the control service implementation and to harmonize the control services behavior, the platform is here provided with two subcomponents, middleware (MW) Application Programmer Interface (API) 340a and 340b, and node manager (NM) API 350a and 350b to be used in the control service interactions with the platform.

Each component has its own data base for runtime and configuration data, i.e. there is no separate component acting as a central data base used by all components. The component runtime data base is optimized for the most frequent data accesses, e.g. for control logic execution and allows control services to have a specific information model, e.g. IEC 61131-3 information model with POUs, variables etc. Information not needed by others is hidden inside the control service. In this respect, the database may be provided as anything that is configured to store data such as a traditional database, a class, a table, or any other type of suitable data structure.

The runtime data can be divided in two categories, runtime data containing states that must be retained in case of a restart, reconfiguration etc. of the component, and runtime data that can be recalculated after a restart, reconfiguration etc. Alarm condition states is one example of runtime data that must be retained, whereas control logic variables that are recalculated in each task cycle don't need to be retained.

All control service states are collected regularly by the control service, e.g. at the end of each scan in the control logic task execution. The control service uses the NM API subcomponent to persist the collected states. The persisted states can be used in several use cases, dynamic load balancing, redundancy synchronization, reconfiguration, etc. of control services.

Preferably, the collected states are persisted in a firmware version and hardware independent format to enable load balancing between controllers with different firmware versions and different hardware architectures.

Dynamic load balancing is configured in the engineering tools for controllers, gateways and devices. Maximum accepted load for a node is configured, and the control logic is allocated to a cluster of controllers. Also gateways and devices having spare capacity that can be used for control logic execution can be part of the cluster. The load balancing configuration is downloaded to the cluster nodes, as part of the node configuration. Preferably, all configuration data, for all control logic, is sent to all nodes, to speed up the reallocation in case of overload.

The node manager component is responsible for the dynamic load balancing and is the receiver of the load balancing configuration downloaded from the engineering tool. The load balancing configuration e.g. lists the load balancing cluster nodes. That is, the node manager 330a may be configured to perform process block S100.

During the node configuration, the load balancing master role, and preferably also a redundant load balancing master role, are negotiated by the nodes. That is, the node manager 330a is configured to perform process block S110. The load balancing master is responsible for the monitoring and balancing of the node loads in all cluster nodes. The redundant load balancing master role is to take over the master role in case the negotiated master is no longer able to balance the load, e.g. due to an internal error. The negotiation may be based on communication between the nodes, and e.g. based on mac address, current load etc., to select one of the nodes to be the master.

Figure 5:
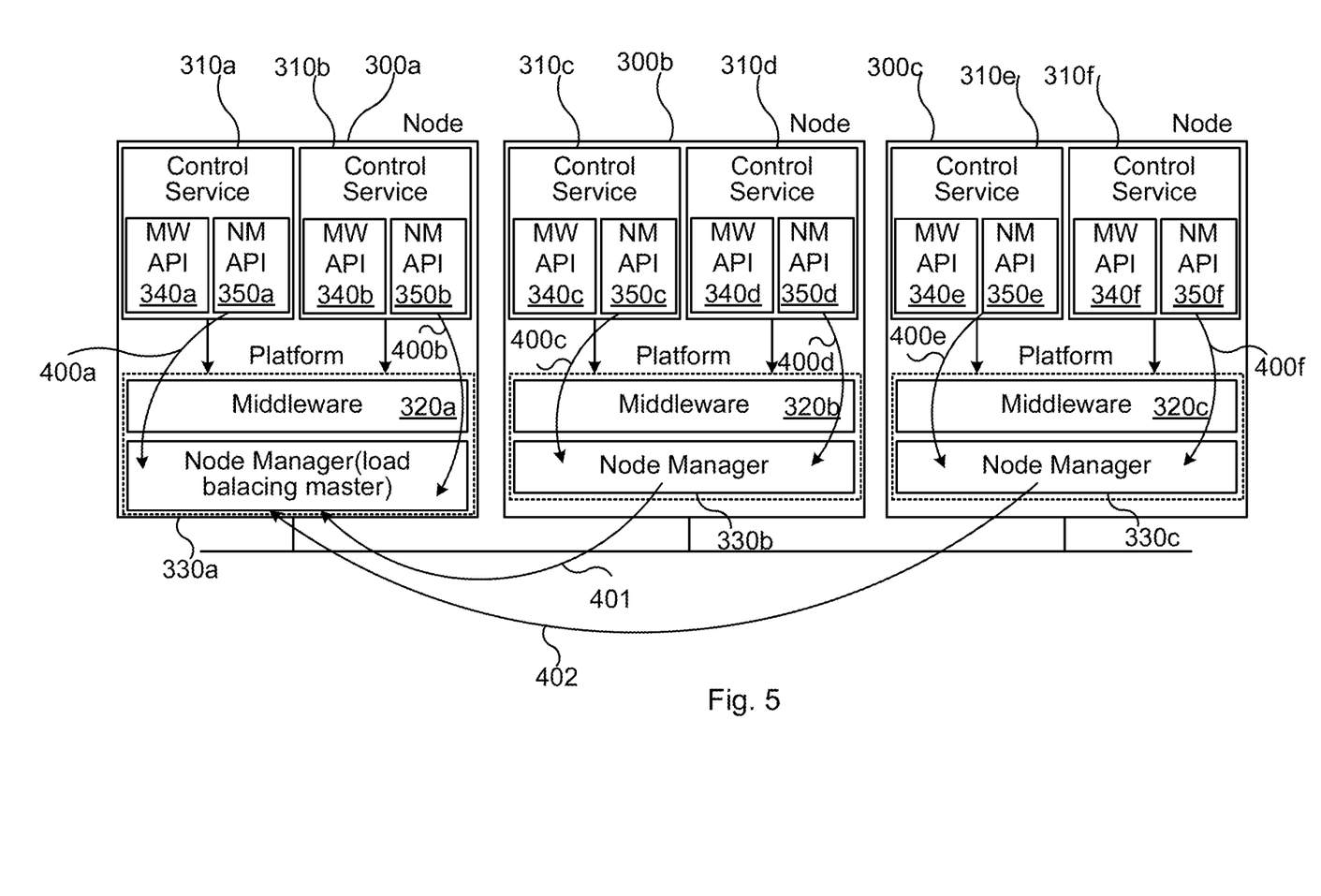
FIG. 5 schematically illustrates publication of current load.

The node manager component 330a in the load balancing master, subscribes to load balancing information from all nodes 300b and 300c in the cluster. That is, the node manager 330a is configured to perform process block S120. In each node 300a, 300b, and 300c in the cluster, each control service 310a, 310b, 310c, 310d, 310e, and 310f regularly provides the corresponding NM API subcomponent 350a, 350b, 350c, 350d, 350e and 350f with current load data. NM API 350a and 350b forwards the data to node manager 330a as shown symbolically by arrows 400a and 400b, respectively. NM API 350c and 350d forwards the data to node manager 330b as shown symbolically by arrows 400c and 400d, respectively, and NM API 350e and 350f forwards the data to node manager 330c as shown symbolically by arrows 400e and 400f, respectively, and node managers 330b and 330c sends the data to node manager 300a in the load balancing master node 330a as shown symbolically by arrow 401 and 402, as illustrated in FIG. 5. To simplify the control service implementation and to harmonize the control services behavior, the platform is here provided with further subcomponents, MW APIs 340a, 340b, 340c, 340d, 340e, and 340f to be used in the control service interactions with the platform.

In case of an overload situation in any of the cluster nodes, node management in the load balancing master decides, based on the current load situation, on reallocation of control logic from one node to another. That is, the node manager 330a is configured to perform process block S130. The load balancing master sends commands to the overloaded node as well as to the new node, to prepare for a reallocation. That is, the node manager 330a may be configured to perform process block S140. The new node loads the control logic configuration and prepares the new node for execution by, e.g. subscribing to signals in middleware using the MW API. When the reallocation preparations are ready, the master sends a commit command to both nodes. That is, the node manager 330a may be configured to perform process block S150. The overload node stops its control logic execution and starts sending the collected states to the new node, which applies the states and starts executing the reallocated control logic.

Figure 6:
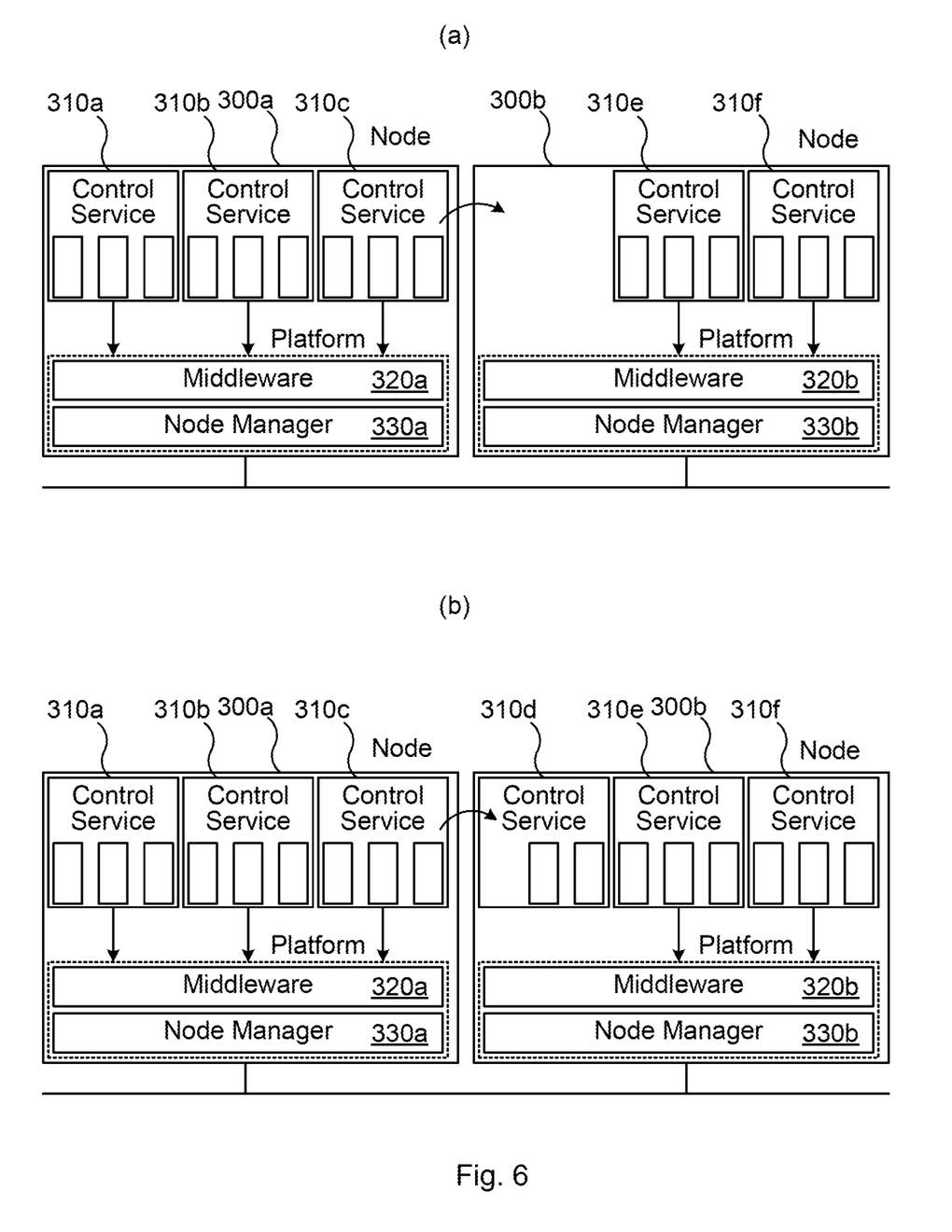
FIG. 6 schematically illustrates dynamic load balancing.

The granularity for the reallocation can be either a complete control service 310a, 310b, 310c, 310e, or 310f, or parts of a control service 310c, e.g. a control logic task illustrated as boxes in the control services 310a-310f in FIG. 6. The granularity is also applicable to processing block S130. Reallocation of a complete control service 310c is illustrated in FIG. 6(a), and reallocation of a control logic task of control service 310c is illustrated in FIG. 6(b). FIG. 6 additionally illustrates node 300a and node 300b, middleware 320a and 320b, and node manager 330a and 330b, with corresponding function as described in connection with FIG. 4.

A control service has no knowledge about where its control service communication partners are allocated. Therefore, a control service that publishes a data set (a group of signals) can be reallocated to another node without affecting the subscriber(s) of the data set, and a control service that subscribes to a data set can be reallocated to another node without affecting the publisher of the data set. Similarly, a part of a control service, e.g. a control logic task that publishes a data set can be reallocated without affecting the subscribers and vice versa.

Generally speaking, also applicable to processing block S120, a control service needing process data or runtime data for its operation, sometimes referred to as input process data or input runtime data, may be set to subscribe to the process data, which process data is a signal that may comprise control signals, status data and/or process measurement values. A control service delivering process data, sometimes referred to as output process data or output runtime data, may in turn publish the process data, which may also comprise control signals, status data and/or process measurement values. The process data being published may be grouped in data sets. Each data set may additionally be assigned to a multicast address, e.g. IPV4 or IPV6. Binding of signal subscribers and signal publishers may be based on the Open Platform Communications Unified Architecture (OPC UA) standard of the OPC foundation, OPC UA PubSub with dynamic multicast filtering in the network and publish/subscribe to multicast addresses. The middleware service subscribes to data set multicast addresses on the network, and when the middleware service publishes a data set on one of these multicast addresses, the dynamic multicast filtering in the network ensures that this data set is distributed only to the nodes that have subscribed to this multicast address, e.g. by switches. Other protocols and mechanisms than OPC UA PubSub with dynamic multicast filtering may be used for the binding of publishers and subscribers, e.g. OPC UA client/server with additional discovery services.

It can thereby be seen that all the control services of a node are communicating with other control services via a middleware service of the node using publication of process data and subscription to process data. By using multicasting, the process data publishing and the subscribing are bound by multicast addresses.

Other types of communication, e.g. access of runtime data from operations and engineering, requires different actions depending on the type of communication. If the communication is based on publish subscribe to multicast addresses, there is no need for action. If the communication is based on a client server pattern there is need for some handling. One alternative is that the client will have to discover/browse to find out the new allocation of the control logic runtime data. A second alternative is that the server that no longer hosts the reallocated control logic, forwards the request to the node that hosts the reallocated control logic. A third alternative is that the server informs the client where the reallocated control logic is allocated.

The presented load balancing functions well with all controllers, gateways and devices having a middleware service for signal exchange that makes it possible for any control service to access any signal in any other control service without knowledge of network layout, control service deployment, or control service internals, a middleware service binding mechanism making it possible to move a signal publisher from one node to another without affecting the subscribers, and vice versa, middleware as well as control services are built as separate executables, running in separate operating system processes, each component has its own data base for runtime and configuration data, i.e. there is no separate component acting as a central data base used by all components, all control service states are collected regularly, and the load balancing master regularly receives load data from each node in the load balancing cluster.

Figure 7:
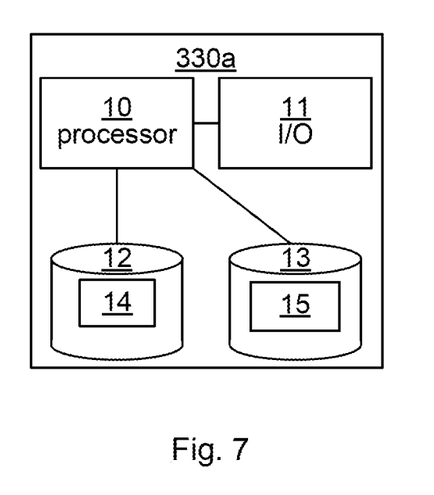
FIG. 7 is a schematic diagram illustrating some components of devices presented herein.

An embodiment of a node manager for dynamic load balancing in a network centric process control system is presented with reference to FIG. 7. The network centric process control system 100 comprises a plurality of nodes 300a and each node comprises control service components 310a, where each control service component is a separate executable running in a separate operating system process as provided by a real time operating system of each node. The node manager 330a comprises a processor 10 and a computer program product 12, 13 storing instructions that, when executed by the processor, causes the node manager to negotiate a load balancing master role between the plurality of nodes, subscribe, in the negotiated load balancing master role, to load balancing information from all nodes of the load balancing cluster nodes, and to reallocate, in the negotiated load balancing master role, one or more control logic tasks from one node to another node of the plurality of nodes based on the subscribed load balancing information.

The node manager 330a may in reallocation be caused to send, in the negotiated load balancing master role, initiation commands to two of the plurality of nodes, to prepare to reallocate control logic tasks there between, and to send, in the negotiated load balancing master role, commit commands to the two of the plurality of nodes, to stop the prepared control logic execution in one of the two nodes and to start the prepared control logic execution in the other of the two nodes. The initiation commands may comprise an instruction to load control logic configuration for the control logic tasks to be taken over. The commit commands may comprise an instruction to synchronize states for the control logic tasks to be taken over.

Each node 300a may further comprise a middleware service 320a managing subscribing to signals and publishing of signals.

The one or more control logic tasks may constitute a control service 310a of the node 300a.

The node manager 330a may in negotiate be caused to negotiate a redundant load balancing master role between the plurality of nodes 300a.

The node manager 330a may further be caused to receive, prior to negotiate, a load balancing configuration from an engineering tool of the network centric process control system 100, which load balancing configuration comprises the indication of the plurality of nodes representing the load balancing cluster nodes.

The negotiating may be based on load balancing configuration comprising the indication of the load balancing cluster nodes.

The subscribe processing block may comprise subscribe to a load balancing information from all nodes of the load balancing cluster nodes.

The node may be one or more of a device node 300b, a fieldbus gateway node 300c and a controller node 300a.

FIG. 7 is a schematic diagram showing some components of the node manager 330. The processor or processing circuitry 10 may be provided using any combination of one or more of a suitable central processing unit (CPU), multiprocessing circuitry, microcontroller, digital signal processing circuitry (DSP), application specific integrated circuit etc., capable of executing software instructions of a computer program 14 stored in a memory. The memory can thus be considered to be or form part of the computer program product 12. The processing circuitry 10 may be configured to execute methods described herein with reference to FIGS. 3A and 3B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory (RAM), and read only memory (ROM), and may also comprise persistent storage, which, for example, can be any single one or combination of magnetic memory, optical memory, solid state memory or even remotely mounted memory. The data memory may e.g. hold other software instructions 15, to improve functionality for the node manager 330a.

The node manager 330a may further comprise an input/output (I/O) interface 11 including e.g. a user interface. The node manager 330a may further comprise a receiver configured to receive signaling from other nodes, and a transmitter configured to transmit signaling to other nodes (not illustrated). Other components of the node manager are omitted in order not to obscure the concepts presented herein.

An embodiment of a computer program for dynamic load balancing in a network centric process control system 100 is presented with reference to FIG. 7. The network centric process control system comprises a plurality of nodes 300a and each node comprising control service components 310a, where each control service component is a separate executable running in a separate operating system process as provided by a real time operating system of each node. The computer program comprises computer program code, which when run in a network centric process control system 100, causes the network centric process control system 100 to negotiate a load balancing master role between the plurality of nodes 300a, wherein the negotiating is based on an indication of the plurality of nodes representing load balancing cluster nodes, subscribe, in the negotiated load balancing master role, to a load balancing information from nodes of the load balancing cluster nodes, and to reallocate, in the negotiated load balancing master role, one or more control logic tasks from one node to another node of the plurality of nodes based on the subscribed load balancing information.

A computer program product 12, 13, comprising a computer program 14, 15 and a computer readable storage means on which the computer program 14, 15 is stored is also presented.

Figure 8:
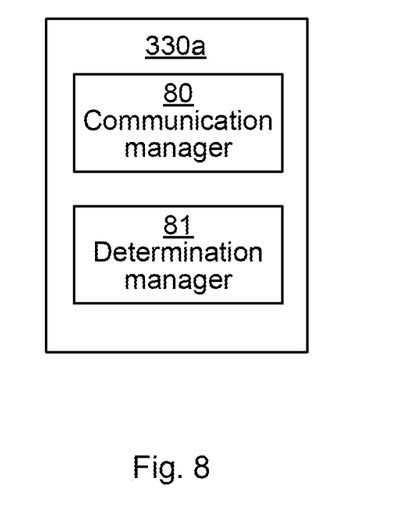
FIG. 8 is a schematic diagram illustrating functional modules of devices presented herein.

A node manager 330a for dynamic load balancing in a network centric process control system 100 is presented with reference to FIG. 8. The network centric process control system comprises a communication manager 80 for receiving S100 a load balancing configuration from an engineering tool of the network centric process control system 100, which load balancing configuration comprises an indication of the plurality of nodes representing load balancing cluster nodes, and for subscribing S120, in the negotiated load balancing master role, to load balancing information from all nodes of the load balancing cluster nodes, and determination manager 81 for negotiating S110 a load balancing master role between the plurality of nodes, and for reallocating S130, in the negotiated load balancing master role, one or more control logic tasks from one node to another node of the plurality of nodes based on the subscribed load balancing information.

FIG. 8 is a schematic diagram showing functional blocks of the node manager 330a. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the processing blocks in the methods illustrated in FIGS. 3A and 3B, comprising a communication manager unit 80 and a determination manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 80 is for dynamic load balancing in a network centric process control system 100. This module corresponds to the processing blocks S100 and S120 of FIGS. 3A and 3B. This module can e.g. be implemented by the processing circuitry 10 of FIG. 7, when running the computer program.

The determination manager 81 may be used for dynamic load balancing in the network centric process control system 100. This module corresponds to processing blocks S110 and S120 of FIGS. 3A and 3B. This module can e.g. be implemented by the processing circuitry 10 of FIG. 7, when running the computer program.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for dynamic load balancing between nodes in a network centric process control system, the network centric process control system comprising a plurality of nodes and each node including control service components, where each control service component is a separate executable running in a separate operating system process as provided by a real time operating system of each node, the method being performed by a node manager of a node, the method including the steps:
   negotiating a load balancing master role between the plurality of nodes, wherein the negotiating is based on an indication of the plurality of nodes representing load balancing cluster nodes;
   subscribing, in the negotiated load balancing master role, to a load balancing information from nodes of the load balancing cluster nodes; and
   reallocating, in the negotiated load balancing master role, one or more control logic tasks from one node to another node of the plurality of nodes based on the subscribed load balancing information;
   wherein the reallocation comprises:
      sending, in the negotiated load balancing master role, initiation commands to two of the plurality of nodes, to prepare to reallocate control logic tasks there between; and
      sending, in the negotiated load balancing master role, commit commands to the two of the plurality of nodes, to stop the prepared control logic execution in one of the two nodes and to start the prepared control logic execution in the other of the two nodes.

2. The method according to claim 1, wherein the initiation commands comprise an instruction to load control logic configuration for the control logic tasks to be taken over and the commit commands include an instruction to synchronize states for the control logic tasks to be taken over.

3. The method according to claim 1, wherein each node further comprises a middleware service managing subscribing to signals and publishing of signals.

4. The method according to claim 1, wherein the one or more control logic tasks constitute a control service of the node.

5. The method according to claim 1, wherein the negotiating is based on load balancing configuration including the indication of the load balancing cluster nodes.

6. The method according to claim 1, further comprising:
   receiving, prior to negotiating, a load balancing configuration from an engineering tool of the network centric process control system, wherein the load balancing configuration comprises the indication of the plurality of nodes representing the load balancing cluster nodes.

7. The method according to claim 1, wherein the negotiating further comprises negotiating a redundant load balancing master role between the plurality of nodes.

8. A node manager for dynamic load balancing in a network centric process control system, the network centric process control system comprising a plurality of nodes and each node including control service components, where each control service component is a separate executable running in a separate operating system process as provided by a real time operating system of each node, the node manager including:
- a processor; and
- a computer program product storing instructions that, when executed by the processor, causes the node manager to:
- negotiate a load balancing master role between the plurality of nodes, wherein the negotiating is based on an indication of the plurality of nodes representing load balancing cluster nodes;
- subscribe, in the negotiated load balancing master role, to a load balancing information from nodes of the load balancing cluster nodes; and
- reallocate, in the negotiated load balancing master role, one or more control logic tasks from one node to another node of the plurality of nodes based on the subscribed load balancing information;
- wherein the reallocation comprises the node manager being caused to:
  - send, in the negotiated load balancing master role, initiation commands to two of the plurality of nodes, to prepare to reallocate control logic tasks there between; and
  - send, in the negotiated load balancing master role, commit commands to the two of the plurality of nodes, to stop the prepared control logic execution in one of the two nodes and to start the prepared control logic execution in the other of the two nodes.

9. The node manager according to claim 8, wherein the initiation commands comprise an instruction to load control logic configuration for the control logic tasks to be taken over, and the commit commands include an instruction to synchronize states for the control logic tasks to be taken over.

10. The node manager according to claim 8, wherein the negotiating is based on load balancing configuration including the indication of the load balancing cluster nodes.

11. The node manager according to claim 8, wherein the subscribe comprises subscribe to a load balancing information from all nodes of the load balancing cluster nodes.

12. A computer program product for dynamic load balancing in a network centric process control system, the network centric process control system having a plurality of nodes and each node including control service components, where each control service component is a separate executable running in a separate operating system process as provided by a real time operating system of each node, the computer program product comprising:
- a non-transitory computer-readable storage medium; and
- a computer program code stored on the non-transitory computer-readable medium and being configured to, when run in a node manager of the network centric process control system, cause the node manager to:
- negotiate a load balancing master role between the plurality of nodes, wherein the negotiating is based load balancing configuration having the indication of the load balancing cluster nodes;
- subscribe, in the negotiated load balancing master role, to load balancing information from all nodes of the load balancing cluster nodes; and
- reallocate, in the negotiated load balancing master role, one or more control logic tasks from one node to another node of the plurality of nodes based on the subscribed load balancing information;
- wherein the reallocation comprises the node manager being caused to:
  - send, in the negotiated load balancing master role, initiation commands to two of the plurality of nodes, to prepare to reallocate control logic tasks there between; and
  - send, in the negotiated load balancing master role, commit commands to the two of the plurality of nodes, to stop the prepared control logic execution in one of the two nodes and to start the prepared control logic execution in the other of the two nodes.

13. The method according to claim 2, wherein each node further comprises a middleware service managing subscribing to signals and publishing of signals.

14. The method according to claim 2, wherein the one or more control logic tasks constitute a control service of the node.

15. The method according to claim 2, wherein the negotiating is based on load balancing configuration including the indication of the load balancing cluster nodes.

16. The method according to claim 2, further comprising:
receiving, prior to negotiating, a load balancing configuration from an engineering tool of the network centric process control system, wherein the load balancing configuration comprises the indication of the plurality of nodes representing the load balancing cluster nodes.

* * * * *